March 27, 1956

E. J. LUCE ET AL 2,740,017

ELECTRICAL FUSE HOLDER ASSEMBLY

Filed Nov. 10, 1953

INVENTORS
EDWARD J. LUCE &
THOMAS D. REEDY.
BY Barnes Kisselle Laughlin & Raisch
ATTORNEYS.

March 27, 1956 E. J. LUCE ET AL 2,740,017
ELECTRICAL FUSE HOLDER ASSEMBLY
Filed Nov. 10, 1953 2 Sheets-Sheet 2

INVENTORS
EDWARD J. LUCE &
THOMAS D. REEDY.
BY Barnes Kisselle Laughlin & Raisch
ATTORNEYS.

United States Patent Office 2,740,017
Patented Mar. 27, 1956

2,740,017
ELECTRICAL FUSE HOLDER ASSEMBLY

Edward J. Luce, Dearborn, and Thomas D. Reedy, Detroit, Mich., assignors to Wire Assemblies Corporation, Detroit, Mich., a corporation of Michigan Application November 10, 1953, Serial No. 392,451

7 Claims. (Cl. 200—133)

This invention relates to the structure for receiving and holding a plurality of electrical fuses and it may be referred to as a fuse holder assembly.

The invention contemplates a structure especially useful with automotive vehicles, such as passenger cars, trucks, tractors, but, of course, the invention may be employed elsewhere and the fuses may be grouped in multiple or used singly. The invention may be used with stationary engines the service equipment and in building construction. For convenience, however, the invention is disclosed with reference to an automotive vehicle.

In accordance with the invention, the fuse holding structure may be mounted on a panel provided with a suitable opening. The assembly closes the panel and seals against passage of moisture and gases and where the fuses are in multiple each fuse holding device seals its respective opening. The fuses referred to are of the type which are somewhat elongated and generally cylindrical in form and they may be disposed in an opening in the panel in substantially parallel relationship with the axes of the fuses perpendicular or substantially perpendicular to the panel. In an automotive vehicle, the panel employed may be the dividing wall between the engine compartment and the passenger compartment. In this situation, the source of E. M. F. is usually in the engine compartment while many of the accessories on the vehicle may be remotely located and the controlling switches located in the passenger compartment. With the fuse or fuses thus positioned on the panel electrical energy may pass through the panel although this is not necessary.

Further, in accordance with the invention, the fuses are accessible for service or replacement on each side of the panel as the assembly permits of removing the fuses from each side of the panel. In this connection, a service man or mechanic need not enter or work from the passenger compartment. Accordingly, if service is needed, for example, while passengers are in the vehicle, the mechanic can work entirely from the engine side of the partition where the fuses are readily accessible and handy without disturbing the passengers. There are other features and objects of the invention which will be appreciated as the following specification is considered with reference to the accompanying drawings. The drawings show one form of device for carrying out the invention.

Figure 1:
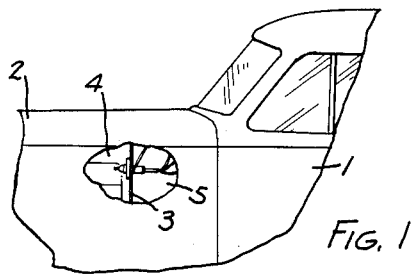
Fig. 1 is a general view illustrating a portion of an automotive vehicle with part cut away illustrating a convenient location for the mounting of the assembly.

In Fig. 1, a portion of the vehicle is illustrated at 1 with the usual hood or bonnet 2 and a partition or fire wall 3 separating the engine compartment 4 and the space 5 to the rear thereof which opens into the passenger compartment.

Figure 2:
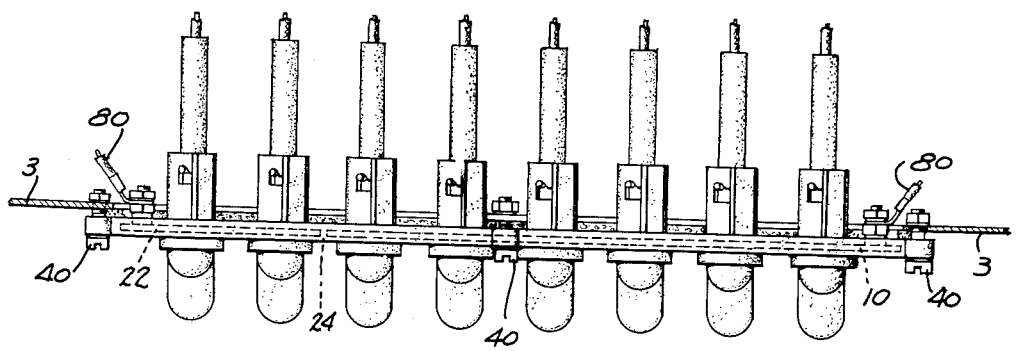
Fig. 2 is a plan view illustrating the assembly mounted in the panel.
Figure 6:
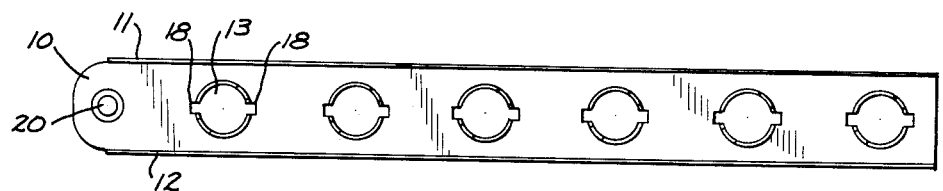
Fig. 6 is an elevational view of a base member looking from the right hand side of Fig. 5.

The assembly embodies a metallic base member or core, generally illustrated at 10 (Fig. 6). This conveniently is a strip of metal fashioned with opposite flanges 11 and 12 and provided with a plurality of openings 13. The metal defining the openings is pressed from the plane of the plate to form a sort of collar 15 and the collar surrounding each opening is formed with a pair of recesses 16. Each opening has slots 18 and the slots 18 with the recesses 16 form part of a bayonet type connection. The base member is provided with a terminal 20 which may be a stud spot welded to the body of the strip forming the base member. As shown in Fig. 2, two base members are shown, one indicated at 10 and another indicated at 22, as will be seen in Fig. 6. The base member 22 is similarly formed but may be shorter and it has a terminal 23. The openings 13 and the surrounding collars and the slots have reference characters applied which are the same as those characters in Fig. 6.

Figure 3:
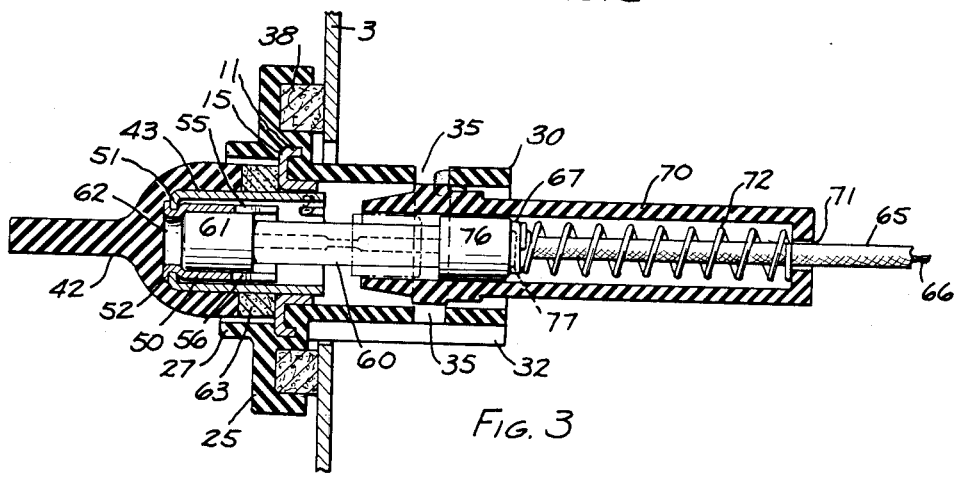
Fig. 3 is an enlarged cross sectional view taken through one fuse holder and illustrating the fuse in position.
Figure 5:
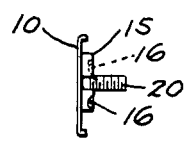
Fig. 5 is an end view of a base member.
Figure 7:
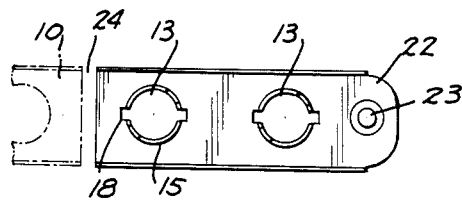
Fig. 7 is an elevational view of another base member similar to Fig. 6 showing in dotted lines its relationship with the first named base member.
Figure 8:
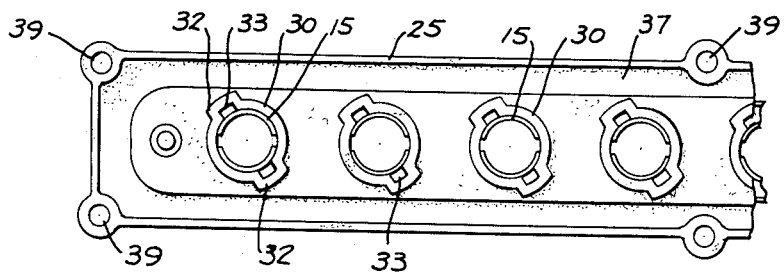
Fig. 8 is an elevational view of the body of the assembly showing the base member with electrical insulation covering.
Figure 9:
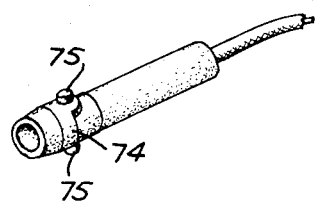
Fig. 9 is a perspective view showing a holder attached to the end of a wire.

In an assembly such as is shown in Fig. 2, only a single base member may be used, but when two are used, they are spaced apart as shown at 24, so that they are electrically insulated for purposes which will presently appear. The base member or members are embedded in a plastic substance which may be molded over the base. This substance which is dielectric, is preferably of one of the synthetic materials, such as nylon or a form of rubber, natural or synthetic. This covering body is illustrated generally at 25, and on one side it has a plurality of openings which may be defined each by a circular flange 27 in line with the openings 13 in the base. On the opposite side the body has a plurality of extensions in line with the openings in the base as illustrated at 30 (Fig. 8). Each extension 30 has opposite wall sections 32 of relatively enlarged diameter thus forming slots 33. The intervening wall portions are provided with openings 35. This forms a bayonet type coupling member as the slots 33 communicate with the openings 35. The body member is formed to provide a groove 37 for receiving a suitable gasket 38 and it is formed with openings 39 at suitable locations for attachment to the panel. This body may be placed relative to the panel as shown in Fig. 3, with the projections 30 extending through the panel as shown and with the gasket 38 lying against the panel on the opposite side thereof. It may be secured in position by screws or bolts 40 which pass through the openings 39.

Figure 4:
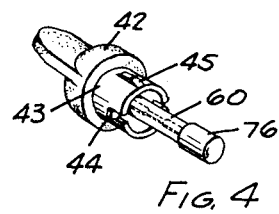
Fig. 4 is a detailed perspective view illustrating a removable part with a fuse held thereby.

There is a cap which is a fuse holder constituted by a plastic member 42 and a metallic sleeve 43 which has a projecting end portion, as shown in Fig. 4. This sleeve is provided with opposite fingers or projections 44. The sleeve is arranged to pass into the opening 13 with the projections 44 passing through the slots 18 and then upon turning the cap the projections 44 seat in the recesses 16. To hold the sleeve snug in its opening, the metal of the wall of the projecting portion may be displaced outwardly as at 45 on opposite sides thereof. This forms yielding portions which yieldingly grip the flange 15 to thus snugly hold the cap in place in non-rattling condition and in electrical contact with the core.

The base part of the sleeve is secured to a socket or fuse receiver. This socket is illustrated at 50. The sleeve has an inturned flange 51 and the socket has an outturned flange 52 which interengage each other to securely hold the cup in the sleeve. The socket is actually tubular in form and its walls are slotted as at 55 and 56 so as to give a measure of resiliency. The body portion of a fuse is illustrated at 60 and the head at one end is illustrated at 61 and the cup is designed to receive the head as shown in Fig. 3. The head 61 may be engaged in the cup with some friction. It is to be noted that the bottom of the cup is open as at 62 so as to make no electrical contact with the extreme end of the head where there is the usual solder connection for the fuse element. The fuse is illustrated as being positioned in the cap as shown in Fig. 4. A gasket 63 is preferably disposed between the cap 42 and the base 10.

As stated above, the several wires or conductors are secured to the assembly on the side of the panel opposite the cap 42. One wire or conductor is illustrated at 65, the same being insulated with metallic conductor 66 and on the end of this wire is a contact piece or button or rivet 67. A member formed of dielectric material, such as a suitable plastic, and advantageously nylon, and which is of tubular form, is illustrated as at 70 and the conductor passes through an opening 71 therein and a coil spring 72 is disposed between the contact button 67 and the end of the member 70. The wire freely passes through the opening 71 so that the button 67 may freely shift in the member 70. The member 70 has a head 74 designed to be passed into the extension 30, as shown in Fig. 3, and it has opposite projections 75. In securing the member 70 in position the projections 75 are caused to pass through the slots 33 and when they align with openings 35 the member 70 is turned on its axis so that the projections seat in the re-entrant portions of the openings 35. The head 76 of the fuse makes contact with the button 67. The button 67 is preferably recessed on its face as shown at 77 so as to avoid contact with the center part of the head 76 where the usual solder connection is made for the fuse element. When the assembly is made, as shown in Fig. 2, suitable conductors 80 may be attached to the terminal posts of the base members for the completion of the electrical circuit.

It will be seen that the electrical circuit through any one of the fuses, is completed through a conductor 80, the terminal post, the base member or core, the sleeve 43, the receiver or cup 50, through the fuse into the contact 67 and conductor 66. It will be noted that the fuse is accessible from the passenger side of the panel by the simple expedient of removing the member 70. Also, for normal service operations, the cap 42 may be removed and in this event the fuse most probably will be removed with the cap as shown in Fig. 4. The fuses, instead of being positioned laterally with respect to any person servicing or manipulating the fuses are disposed endwise and thus extend through a panel which an operator or other person faces. All fuses of a vehicle are thus in a central location and easily accessible. In a normal installation the base member may be made with some extra openings to take care of additional wiring which may be desired for added accessories or the like.

Some fuses may be longer than others as they may vary in capacity, and the only variation required in this assembly is the length of the spring 72. Also, the springs may be varied as to rate or pressure provided. The spring 72 serves the purpose of holding the fuse under compression and thus holds the projections 44 of the sleeve snugly in the recesses 16 of the base. In the same manner the spring holds the projections 75 in the recesses 35.

The purpose of using two electrically insulated cores is to take care properly of the circuits for different purposes and different accessories. For example, in an automotive vehicle, some accessories can be energized only when the main ignition switch of the engine is closed. These include such things as the heater fan, defroster fan, and other things as desired. However, some of the lights such, for example, for illuminating the interior of a car, are intended to operate at all times regardless of whether or not the engine is running. Accordingly, one core may be connected to be controlled by an ignition switch of the engine of the vehicle so that when the ignition switch is turned off no circuit can be completed through that core. The other core may be connected independently of the ignition switch.

We claim:

1. An electrical fuse holder assembly comprising, a metallic base member having a plurality of openings therein and having attaching means adjacent the openings, a body of dielectric material over the base member and having openings therein in alignment of those in the base member so that the metal defining the openings in the base member is exposed, a first member having a projecting metallic part with attaching means thereon and which is adapted to be inserted in an opening in the base member from one side thereof, the attaching means on the said base member and first member cooperating to hold the first member attached to the base member in electrical contact, the body of dielectric materials having a plurality of hollow extensions projecting to the opposite side of the base member in substantial alignment of the openings in the base member and said body and having attaching means, a second member of hollow form and of dielectric material insertable in a hollow extension and having attaching means for cooperation with the attaching means on the hollow extension for holding the second member in position facing the first member, one member having a metal socket for receiving one end of a fuse, the other member having a spring pressed electrical contact therein for yieldably engaging the opposite end of the fuse when the two members are attached as specified with a fuse therebetween.

2. An electrical fuse holder assembly comprising, a metallic base member having a plurality of openings therein and having attaching means adjacent the openings, a body of dielectric material over the base member and having openings therein in alignment of those in the base member the metal of the base member defining the openings being exposed, a first member having a projecting metallic part with attaching means thereon and which is adapted to be inserted in an opening in the base member from one side thereof, the attaching means on the first and base members cooperating to hold the first member attached to the base member in electrical contact, the said body having a plurality of hollow extensions of dielectric material projecting to the opposite side of the base member in substantial alignment of the openings in the base member and body and having attaching means, a second member of hollow form and of dielectric material insertable in a hollow extension and having attaching means for cooperation with the attaching means on the hollow extension for holding the second member in position facing the first member, the first member having a metallic socket therein for receiving one end of the fuse, a spring in the second member, an electrical contact in the second member acted upon by the spring and adapted to engage yieldably the opposite end of the fuse when the two members are secured in position as above stated.

3. An electrical fuse holder assembly comprising, a metallic base member having a plurality of openings therein and having attaching means adjacent the openings, a body of dielectric material over the base member and having openings therein in alignment of those in the base member with the metal of the base member exposed at the openings, a first member having a projecting part with attaching means thereon and which is adapted to be inserted in an opening in the base member from one side thereof, the attaching means on respective members cooperating to hold the first member attached to the base member in electrical contact therewith, the body having a hollow extension projecting to the opposite side of the base member in substantial alignment of the openings in the base member and body and having attaching means, a second member of dielectric material and of hollow form insertable in the hollow extension and having attaching means for cooperation with the attaching means on the hollow extension for holding the second member in position facing the first member, the first member having a metallic socket in electrical contact with its projecting part for receiving one end of the fuse in electrical contact, a coil spring in the second member positioned substantially in axial alignment with the holow extension, a contact in the second member acted upon by the spring and adapted to yieldably engage the oposite end of the fuse when the first and second members are secured in position as above stated.

4. An electrical fuse holder for holding a plurality of fuses on a panel provided with an opening comprising, a dielectric body arranged and constructed to be secured to the panel on one side thereof so as to cover the opening in the panel, the body having an electrical conducting core therein electrically insulated from the surface of the body, the body and core having a plurality of substantially aligned openings therethrough, the material of the core which defines the openings therein being exposed, and each of said openings adapted each to receive a fuse therein, a plurality of first members each having conducting means for receiving one end of a fuse, means on each first member for detachably securing the same in electrical connection to the exposed metal of the core at an opening therein, a plurality of second members, means on each second member for detachably securing the same to the body on the opposite side of the body and panel in facing relation to one of the first members, and a spring pressed contact in each second member adapted to yieldably engage the opposite end of a fuse when two opposite first and second members are connected respectively with the core and body.

5. An electrical fuse holder comprising, an elongated metallic core having a plurality of openings therein, a body of electrical insulating material positioned over the core and having an opening therethrough in alignment with each opening in the core with the opening on one side of the body defined by a hollow extension, the openings being adapted to each receive a fuse extending lengthwise through the openings, the core being exposed at each opening, a plurality of first members each having a conducting socket for receiving one end of a fuse and having an electrical conducting extension for fitting into an opening in the core, means on the extension and core for detachably connecting each first member thereto in electrical contact, a plurality of second members of electrical insulating material, means for detachably connecting each second member to an extension on the body and in a position substantially opposite and facing a corresponding first member, said second members each being of hollow form and having a coil spring therein, and an electrical contact in each second member acted upon by the spring therein to yieldably engage the opposite end of the fuse when corresponding first and second members are secured to the core and body respectively.

6. The electrical fuse holder as described in claim 4 characterized in that the core is constituted by a separate metallic members adapted to be connected into different electrical circuits.

7. In a mounting for an electrical fuse of elongated form with an electrical contact at each end, a body of dielectric material having an opening therein, electrical contact means secured to the body and positioned inwardly of the opening, the opening being adapted to receive a fuse with one end thereof in contact with said contact means, and with the fuse disposed substantially axially of the opening, said body having securing means formed integrally in the material defining said opening, a tubular member of dielectric material which is open at one end and has a bottom at its opposite end, the bottom having an opening therein, a conductor wire slidably passing through said opening, a contact member on the end of the conductor wire and positioned within the tubular member, a coil spring in the tubular member positioned to react against the bottom thereof and against said contact member, the open end of said tubular member being adapted to receive and to telescope over the opposite end of said fuse, whereby said tubular member may be passed over the fuse and the said contact member engaged with the said opposite end of the fuse, the tubular member having a cross dimension such that it telescopes into the opening of the body, securing means integrally formed in the material of the tubular member adjacent its open end for detachable connection with the said securing means on the body, whereby the spring is held compressed and the fuse engaged between the said electrical contact means carried by the body and the said contact member on the end of the conductor wire when said securing means are engaged.

References Cited in the file of this patent

UNITED STATES PATENTS

| | | |
|---|---|---|
| 413,813 | Root | Oct. 29, 1889 |
| 1,481,278 | Wood | Jan. 22, 1924 |
| 1,602,227 | Hentschel | Oct. 5, 1926 |
| 1,740,466 | La Bar | Dec. 24, 1929 |
| 1,934,483 | Brown | Nov. 7, 1933 |
| 1,969,301 | Edwards | Aug. 7, 1934 |
| 2,144,139 | Batcheller | Jan. 17, 1939 |
| 2,207,837 | Sundt | July 16, 1940 |
| 2,417,692 | Kline | Mar. 18, 1947 |
| 2,648,740 | Heath | Aug. 11, 1953 |
| 2,668,215 | Duerkob | Feb. 2, 1954 |
| 2,707,736 | Hollins | May 3, 1955 |

FOREIGN PATENTS

| | | |
|---|---|---|
| 391,955 | Great Britain | June 26, 1931 |